United States Patent
Liu et al.

(10) Patent No.: US 9,286,919 B1
(45) Date of Patent: Mar. 15, 2016

(54) MAGNETIC WRITER HAVING A DUAL SIDE GAP

(71) Applicant: Western Digital (Fremont), LLC, Fremont, CA (US)

(72) Inventors: Feng Liu, San Ramon, CA (US); Zhanjie Li, Pleasanton, CA (US); Tao Pan, San Jose, CA (US); Zhigang Bai, Fremont, CA (US)

(73) Assignee: Western Digital (Fremont), LLC, Fremont, CA (US)

( * ) Notice: Subject to any disclaimer, the term of this patent is extended or adjusted under 35 U.S.C. 154(b) by 0 days.

(21) Appl. No.: 14/574,250

(22) Filed: Dec. 17, 2014

(51) Int. Cl.
   *G11B 5/127* (2006.01)
   *G11B 5/265* (2006.01)
   *G11B 5/60* (2006.01)
   *G11B 5/31* (2006.01)

(52) U.S. Cl.
   CPC ............ *G11B 5/2652* (2013.01); *G11B 5/1278* (2013.01); *G11B 5/2651* (2013.01); *G11B 5/3116* (2013.01); *G11B 5/6082* (2013.01)

(58) Field of Classification Search
   CPC .... G11B 5/3116; G11B 5/1278; G11B 5/315; G11B 5/11; G11B 5/23
   USPC ...................................... 360/125.3
   See application file for complete search history.

(56) References Cited

U.S. PATENT DOCUMENTS

| | | | |
|---|---|---|---|
| 6,016,290 A | 1/2000 | Chen et al. | |
| 6,018,441 A | 1/2000 | Wu et al. | |
| 6,025,978 A | 2/2000 | Hoshi et al. | |
| 6,025,988 A | 2/2000 | Yan | |
| 6,032,353 A | 3/2000 | Hiner et al. | |
| 6,033,532 A | 3/2000 | Minami | |
| 6,034,851 A | 3/2000 | Zarouri et al. | |
| 6,043,959 A | 3/2000 | Crue et al. | |
| 6,046,885 A | 4/2000 | Aimonetti et al. | |
| 6,049,650 A | 4/2000 | Jerman et al. | |
| 6,055,138 A | 4/2000 | Shi | |
| 6,058,094 A | 5/2000 | Davis et al. | |
| 6,073,338 A | 6/2000 | Liu et al. | |
| 6,078,479 A | 6/2000 | Nepela et al. | |
| 6,081,499 A | 6/2000 | Berger et al. | |
| 6,094,803 A | 8/2000 | Carlson et al. | |
| 6,099,362 A | 8/2000 | Viches et al. | |
| 6,103,073 A | 8/2000 | Thayamballi | |
| 6,108,166 A | 8/2000 | Lederman | |
| 6,118,629 A | 9/2000 | Huai et al. | |
| 6,118,638 A | 9/2000 | Knapp et al. | |
| 6,125,018 A | 9/2000 | Takagishi et al. | |
| 6,130,779 A | 10/2000 | Carlson et al. | |

(Continued)

OTHER PUBLICATIONS

Feng Liu, et al., U.S. Appl. No. 14/492,545, filed Sep. 22, 2014, 27 pages.

(Continued)

*Primary Examiner* — Brian Miller (57) ABSTRACT

A magnetic transducer has air-bearing surface (ABS) and includes a main pole, at least one coil, a side shield and a side gap. The coil(s) energize the main pole. A portion of the main pole resides at the ABS. The side gap is between the main pole and the side shield. The side gap is nonmagnetic and includes a first side gap and a second side gap. The first side gap is conformal with the main pole. The second side gap is conformal with the main pole. The first side gap is between the second side gap and the ABS. The second side gap is wider than the first side gap.

17 Claims, 6 Drawing Sheets

(56) References Cited

U.S. PATENT DOCUMENTS

| | | |
|---|---|---|
| 6,134,089 A | 10/2000 | Barr et al. |
| 6,136,166 A | 10/2000 | Shen et al. |
| 6,137,661 A | 10/2000 | Shi et al. |
| 6,137,662 A | 10/2000 | Huai et al. |
| 6,160,684 A | 12/2000 | Heist et al. |
| 6,163,426 A | 12/2000 | Nepela et al. |
| 6,166,891 A | 12/2000 | Lederman et al. |
| 6,173,486 B1 | 1/2001 | Hsiao et al. |
| 6,175,476 B1 | 1/2001 | Huai et al. |
| 6,178,066 B1 | 1/2001 | Barr |
| 6,178,070 B1 | 1/2001 | Hong et al. |
| 6,178,150 B1 | 1/2001 | Davis |
| 6,181,485 B1 | 1/2001 | He |
| 6,181,525 B1 | 1/2001 | Carlson |
| 6,185,051 B1 | 2/2001 | Chen et al. |
| 6,185,077 B1 | 2/2001 | Tong et al. |
| 6,185,081 B1 | 2/2001 | Simion et al. |
| 6,188,549 B1 | 2/2001 | Wiitala |
| 6,190,764 B1 | 2/2001 | Shi et al. |
| 6,193,584 B1 | 2/2001 | Rudy et al. |
| 6,195,229 B1 | 2/2001 | Shen et al. |
| 6,198,608 B1 | 3/2001 | Hong et al. |
| 6,198,609 B1 | 3/2001 | Barr et al. |
| 6,201,673 B1 | 3/2001 | Rottmayer et al. |
| 6,204,998 B1 | 3/2001 | Katz |
| 6,204,999 B1 | 3/2001 | Crue et al. |
| 6,212,153 B1 | 4/2001 | Chen et al. |
| 6,215,625 B1 | 4/2001 | Carlson |
| 6,219,205 B1 | 4/2001 | Yuan et al. |
| 6,221,218 B1 | 4/2001 | Shi et al. |
| 6,222,707 B1 | 4/2001 | Huai et al. |
| 6,229,782 B1 | 5/2001 | Wang et al. |
| 6,230,959 B1 | 5/2001 | Heist et al. |
| 6,233,116 B1 | 5/2001 | Chen et al. |
| 6,233,125 B1 | 5/2001 | Knapp et al. |
| 6,237,215 B1 | 5/2001 | Hunsaker et al. |
| 6,252,743 B1 | 6/2001 | Bozorgi |
| 6,255,721 B1 | 7/2001 | Roberts |
| 6,258,468 B1 | 7/2001 | Mahvan et al. |
| 6,266,216 B1 | 7/2001 | Hikami et al. |
| 6,271,604 B1 | 8/2001 | Frank, Jr. et al. |
| 6,275,354 B1 | 8/2001 | Huai et al. |
| 6,277,505 B1 | 8/2001 | Shi et al. |
| 6,282,056 B1 | 8/2001 | Feng et al. |
| 6,296,955 B1 | 10/2001 | Hossain et al. |
| 6,297,955 B1 | 10/2001 | Frank, Jr. et al. |
| 6,304,414 B1 | 10/2001 | Crue, Jr. et al. |
| 6,307,715 B1 | 10/2001 | Berding et al. |
| 6,310,746 B1 | 10/2001 | Hawwa et al. |
| 6,310,750 B1 | 10/2001 | Hawwa et al. |
| 6,317,290 B1 | 11/2001 | Wang et al. |
| 6,317,297 B1 | 11/2001 | Tong et al. |
| 6,322,911 B1 | 11/2001 | Fukagawa et al. |
| 6,330,136 B1 | 12/2001 | Wang et al. |
| 6,330,137 B1 | 12/2001 | Knapp et al. |
| 6,333,830 B2 | 12/2001 | Rose et al. |
| 6,340,533 B1 | 1/2002 | Ueno et al. |
| 6,349,014 B1 | 2/2002 | Crue, Jr. et al. |
| 6,351,355 B1 | 2/2002 | Min et al. |
| 6,353,318 B1 | 3/2002 | Sin et al. |
| 6,353,511 B1 | 3/2002 | Shi et al. |
| 6,356,412 B1 | 3/2002 | Levi et al. |
| 6,359,779 B1 | 3/2002 | Frank, Jr. et al. |
| 6,369,983 B1 | 4/2002 | Hong |
| 6,376,964 B1 | 4/2002 | Young et al. |
| 6,377,535 B1 | 4/2002 | Chen et al. |
| 6,381,095 B1 | 4/2002 | Sin et al. |
| 6,381,105 B1 | 4/2002 | Huai et al. |
| 6,389,499 B1 | 5/2002 | Frank, Jr. et al. |
| 6,392,850 B1 | 5/2002 | Tong et al. |
| 6,396,660 B1 | 5/2002 | Jensen et al. |
| 6,399,179 B1 | 6/2002 | Hanrahan et al. |
| 6,400,526 B2 | 6/2002 | Crue, Jr. et al. |
| 6,404,600 B1 | 6/2002 | Hawwa et al. |
| 6,404,601 B1 | 6/2002 | Rottmayer et al. |
| 6,404,706 B1 | 6/2002 | Stovall et al. |
| 6,410,170 B1 | 6/2002 | Chen et al. |
| 6,411,522 B1 | 6/2002 | Frank, Jr. et al. |
| 6,417,998 B1 | 7/2002 | Crue, Jr. et al. |
| 6,417,999 B1 | 7/2002 | Knapp et al. |
| 6,418,000 B1 | 7/2002 | Gibbons et al. |
| 6,418,048 B1 | 7/2002 | Sin et al. |
| 6,421,211 B1 | 7/2002 | Hawwa et al. |
| 6,421,212 B1 | 7/2002 | Gibbons et al. |
| 6,424,505 B1 | 7/2002 | Lam et al. |
| 6,424,507 B1 | 7/2002 | Lederman et al. |
| 6,430,009 B1 | 8/2002 | Komaki et al. |
| 6,430,806 B1 | 8/2002 | Chen et al. |
| 6,433,965 B1 | 8/2002 | Gopinathan et al. |
| 6,433,968 B1 | 8/2002 | Shi et al. |
| 6,433,970 B1 | 8/2002 | Knapp et al. |
| 6,437,945 B1 | 8/2002 | Hawwa et al. |
| 6,445,536 B1 | 9/2002 | Rudy et al. |
| 6,445,542 B1 | 9/2002 | Levi et al. |
| 6,445,553 B2 | 9/2002 | Barr et al. |
| 6,445,554 B1 | 9/2002 | Dong et al. |
| 6,447,935 B1 | 9/2002 | Zhang et al. |
| 6,448,765 B1 | 9/2002 | Chen et al. |
| 6,451,514 B1 | 9/2002 | Iitsuka |
| 6,452,742 B1 | 9/2002 | Crue et al. |
| 6,452,765 B1 | 9/2002 | Mahvan et al. |
| 6,456,465 B1 | 9/2002 | Louis et al. |
| 6,459,552 B1 | 10/2002 | Liu et al. |
| 6,462,920 B1 | 10/2002 | Karimi |
| 6,466,401 B1 | 10/2002 | Hong et al. |
| 6,466,402 B1 | 10/2002 | Crue, Jr. et al. |
| 6,466,404 B1 | 10/2002 | Crue, Jr. et al. |
| 6,468,436 B1 | 10/2002 | Shi et al. |
| 6,469,877 B1 | 10/2002 | Knapp et al. |
| 6,477,019 B2 | 11/2002 | Matono et al. |
| 6,479,096 B1 | 11/2002 | Shi et al. |
| 6,483,662 B1 | 11/2002 | Thomas et al. |
| 6,487,040 B1 | 11/2002 | Hsiao et al. |
| 6,487,056 B1 | 11/2002 | Gibbons et al. |
| 6,490,125 B1 | 12/2002 | Barr |
| 6,496,330 B1 | 12/2002 | Crue, Jr. et al. |
| 6,496,334 B1 | 12/2002 | Pang et al. |
| 6,504,675 B1 | 1/2003 | Shukh et al. |
| 6,504,676 B1 | 1/2003 | Hiner et al. |
| 6,512,657 B2 | 1/2003 | Heist et al. |
| 6,512,659 B1 | 1/2003 | Hawwa et al. |
| 6,512,661 B1 | 1/2003 | Louis |
| 6,512,690 B1 | 1/2003 | Qi et al. |
| 6,515,573 B1 | 2/2003 | Dong et al. |
| 6,515,791 B1 | 2/2003 | Hawwa et al. |
| 6,532,823 B1 | 3/2003 | Knapp et al. |
| 6,535,363 B1 | 3/2003 | Hosomi et al. |
| 6,552,874 B1 | 4/2003 | Chen et al. |
| 6,552,928 B1 | 4/2003 | Qi et al. |
| 6,577,470 B1 | 6/2003 | Rumpler |
| 6,583,961 B2 | 6/2003 | Levi et al. |
| 6,583,968 B1 | 6/2003 | Scura et al. |
| 6,597,548 B1 | 7/2003 | Yamanaka et al. |
| 6,611,398 B1 | 8/2003 | Rumpler et al. |
| 6,618,223 B1 | 9/2003 | Chen et al. |
| 6,629,357 B1 | 10/2003 | Akoh |
| 6,633,464 B2 | 10/2003 | Lai et al. |
| 6,636,394 B1 | 10/2003 | Fukagawa et al. |
| 6,639,291 B1 | 10/2003 | Sin et al. |
| 6,650,503 B1 | 11/2003 | Chen et al. |
| 6,650,506 B1 | 11/2003 | Risse |
| 6,654,195 B1 | 11/2003 | Frank, Jr. et al. |
| 6,657,816 B1 | 12/2003 | Barr et al. |
| 6,661,621 B1 | 12/2003 | Iitsuka |
| 6,661,625 B1 | 12/2003 | Sin et al. |
| 6,674,610 B1 | 1/2004 | Thomas et al. |
| 6,680,863 B1 | 1/2004 | Shi et al. |
| 6,683,763 B1 | 1/2004 | Hiner et al. |
| 6,687,098 B1 | 2/2004 | Huai |
| 6,687,178 B1 | 2/2004 | Qi et al. |
| 6,687,977 B2 | 2/2004 | Knapp et al. |
| 6,691,226 B1 | 2/2004 | Frank, Jr. et al. |
| 6,697,294 B1 | 2/2004 | Qi et al. |
| 6,700,738 B1 | 3/2004 | Sin et al. |

(56) References Cited

U.S. PATENT DOCUMENTS

| | | |
|---|---|---|
| 6,700,759 B1 | 3/2004 | Knapp et al. |
| 6,704,158 B2 | 3/2004 | Hawwa et al. |
| 6,707,083 B1 | 3/2004 | Hiner et al. |
| 6,713,801 B1 | 3/2004 | Sin et al. |
| 6,721,138 B1 | 4/2004 | Chen et al. |
| 6,721,149 B1 | 4/2004 | Shi et al. |
| 6,721,203 B1 | 4/2004 | Qi et al. |
| 6,724,569 B1 | 4/2004 | Chen et al. |
| 6,724,572 B1 | 4/2004 | Stoev et al. |
| 6,729,015 B2 | 5/2004 | Matono et al. |
| 6,735,850 B1 | 5/2004 | Gibbons et al. |
| 6,737,281 B1 | 5/2004 | Dang et al. |
| 6,738,223 B2 | 5/2004 | Sato et al. |
| 6,744,608 B1 | 6/2004 | Sin et al. |
| 6,747,301 B1 | 6/2004 | Hiner et al. |
| 6,751,055 B1 | 6/2004 | Alfoqaha et al. |
| 6,754,049 B1 | 6/2004 | Seagle et al. |
| 6,756,071 B1 | 6/2004 | Shi et al. |
| 6,757,140 B1 | 6/2004 | Hawwa |
| 6,760,196 B1 | 7/2004 | Niu et al. |
| 6,762,910 B1 | 7/2004 | Knapp et al. |
| 6,765,756 B1 | 7/2004 | Hong et al. |
| 6,775,902 B1 | 8/2004 | Huai et al. |
| 6,778,358 B1 | 8/2004 | Jiang et al. |
| 6,781,927 B1 | 8/2004 | Heanuc et al. |
| 6,785,955 B1 | 9/2004 | Chen et al. |
| 6,791,793 B1 | 9/2004 | Chen et al. |
| 6,791,807 B1 | 9/2004 | Hikami et al. |
| 6,798,616 B1 | 9/2004 | Seagle et al. |
| 6,798,625 B1 | 9/2004 | Ueno et al. |
| 6,801,408 B1 | 10/2004 | Chen et al. |
| 6,801,411 B1 | 10/2004 | Lederman et al. |
| 6,803,615 B1 | 10/2004 | Sin et al. |
| 6,806,035 B1 | 10/2004 | Atireklapvarodom et al. |
| 6,807,030 B1 | 10/2004 | Hawwa et al. |
| 6,807,332 B1 | 10/2004 | Hawwa |
| 6,809,899 B1 | 10/2004 | Chen et al. |
| 6,816,345 B1 | 11/2004 | Knapp et al. |
| 6,828,897 B1 | 12/2004 | Nepela |
| 6,829,160 B1 | 12/2004 | Qi et al. |
| 6,829,819 B1 | 12/2004 | Crue, Jr. et al. |
| 6,833,979 B1 | 12/2004 | Knapp et al. |
| 6,834,010 B1 | 12/2004 | Qi et al. |
| 6,859,343 B1 | 2/2005 | Alfoqaha et al. |
| 6,859,997 B1 | 3/2005 | Tong et al. |
| 6,861,937 B1 | 3/2005 | Feng et al. |
| 6,870,712 B2 | 3/2005 | Chen et al. |
| 6,873,494 B2 | 3/2005 | Chen et al. |
| 6,873,547 B1 | 3/2005 | Shi et al. |
| 6,879,464 B2 | 4/2005 | Sun et al. |
| 6,888,184 B1 | 5/2005 | Shi et al. |
| 6,888,704 B1 | 5/2005 | Diao et al. |
| 6,891,697 B2 | 5/2005 | Nakamura et al. |
| 6,891,702 B1 | 5/2005 | Tang |
| 6,894,871 B2 | 5/2005 | Alfoqaha et al. |
| 6,894,877 B1 | 5/2005 | Crue, Jr. et al. |
| 6,906,894 B2 | 6/2005 | Chen et al. |
| 6,909,578 B1 | 6/2005 | Missell et al. |
| 6,912,106 B1 | 6/2005 | Chen et al. |
| 6,934,113 B1 | 8/2005 | Chen |
| 6,934,129 B1 | 8/2005 | Zhang et al. |
| 6,940,688 B2 | 9/2005 | Jiang et al. |
| 6,942,824 B1 | 9/2005 | Li |
| 6,943,993 B2 | 9/2005 | Chang et al. |
| 6,944,938 B1 | 9/2005 | Crue, Jr. et al. |
| 6,947,258 B1 | 9/2005 | Li |
| 6,950,266 B1 | 9/2005 | McCaslin et al. |
| 6,952,325 B2 | 10/2005 | Sato et al. |
| 6,954,332 B1 | 10/2005 | Hong et al. |
| 6,958,885 B1 | 10/2005 | Chen et al. |
| 6,961,221 B1 | 11/2005 | Niu et al. |
| 6,969,989 B1 | 11/2005 | Mei |
| 6,975,486 B2 | 12/2005 | Chen et al. |
| 6,987,643 B1 | 1/2006 | Seagle |
| 6,989,962 B1 | 1/2006 | Dong et al. |
| 6,989,972 B1 | 1/2006 | Stoev et al. |
| 7,002,775 B2 | 2/2006 | Hsu et al. |
| 7,006,327 B2 | 2/2006 | Krounbi et al. |
| 7,007,372 B1 | 3/2006 | Chen et al. |
| 7,012,832 B1 | 3/2006 | Sin et al. |
| 7,023,658 B1 | 4/2006 | Knapp et al. |
| 7,026,063 B2 | 4/2006 | Ueno et al. |
| 7,027,268 B1 | 4/2006 | Zhu et al. |
| 7,027,274 B1 | 4/2006 | Sin et al. |
| 7,035,046 B1 | 4/2006 | Young et al. |
| 7,041,985 B1 | 5/2006 | Wang et al. |
| 7,046,490 B1 | 5/2006 | Ueno et al. |
| 7,054,113 B1 | 5/2006 | Seagle et al. |
| 7,057,857 B1 | 6/2006 | Niu et al. |
| 7,059,868 B1 | 6/2006 | Yan |
| 7,070,698 B2 | 7/2006 | Le |
| 7,092,195 B1 | 8/2006 | Liu et al. |
| 7,110,289 B1 | 9/2006 | Sin et al. |
| 7,111,382 B1 | 9/2006 | Knapp et al. |
| 7,113,366 B1 | 9/2006 | Wang et al. |
| 7,114,241 B2 | 10/2006 | Kubota et al. |
| 7,116,517 B1 | 10/2006 | He et al. |
| 7,124,654 B1 | 10/2006 | Davies et al. |
| 7,126,788 B1 | 10/2006 | Liu et al. |
| 7,126,790 B1 | 10/2006 | Liu et al. |
| 7,131,346 B1 | 11/2006 | Buttar et al. |
| 7,133,253 B1 | 11/2006 | Seagle et al. |
| 7,134,185 B1 | 11/2006 | Knapp et al. |
| 7,154,715 B2 | 12/2006 | Yamanaka et al. |
| 7,170,725 B1 | 1/2007 | Zhou et al. |
| 7,177,117 B1 | 2/2007 | Jiang et al. |
| 7,193,815 B1 | 3/2007 | Stoev et al. |
| 7,196,880 B1 | 3/2007 | Anderson et al. |
| 7,199,974 B1 | 4/2007 | Alfoqaha |
| 7,199,975 B1 | 4/2007 | Pan |
| 7,206,166 B2 | 4/2007 | Notsuke et al. |
| 7,211,339 B1 | 5/2007 | Seagle et al. |
| 7,212,384 B1 | 5/2007 | Stoev et al. |
| 7,238,292 B1 | 7/2007 | He et al. |
| 7,239,478 B1 | 7/2007 | Sin et al. |
| 7,248,431 B1 | 7/2007 | Liu et al. |
| 7,248,433 B1 | 7/2007 | Stoev et al. |
| 7,248,449 B1 | 7/2007 | Seagle |
| 7,280,325 B1 | 10/2007 | Pan |
| 7,283,327 B1 | 10/2007 | Liu et al. |
| 7,284,316 B1 | 10/2007 | Huai et al. |
| 7,286,329 B1 | 10/2007 | Chen et al. |
| 7,289,303 B1 | 10/2007 | Sin et al. |
| 7,292,409 B1 | 11/2007 | Stoev et al. |
| 7,296,339 B1 | 11/2007 | Yang et al. |
| 7,307,814 B1 | 12/2007 | Seagle et al. |
| 7,307,818 B1 | 12/2007 | Park et al. |
| 7,310,204 B1 | 12/2007 | Stoev et al. |
| 7,318,947 B1 | 1/2008 | Park et al. |
| 7,324,304 B1 | 1/2008 | Benakli et al. |
| 7,333,295 B1 | 2/2008 | Medina et al. |
| 7,337,530 B1 | 3/2008 | Stoev et al. |
| 7,342,752 B1 | 3/2008 | Zhang et al. |
| 7,349,170 B1 | 3/2008 | Rudman et al. |
| 7,349,179 B1 | 3/2008 | He et al. |
| 7,354,664 B1 | 4/2008 | Jiang et al. |
| 7,363,697 B1 | 4/2008 | Dunn et al. |
| 7,367,112 B2 | 5/2008 | Nix et al. |
| 7,371,152 B1 | 5/2008 | Newman |
| 7,372,665 B1 | 5/2008 | Stoev et al. |
| 7,375,926 B1 | 5/2008 | Stoev et al. |
| 7,379,269 B1 | 5/2008 | Krounbi et al. |
| 7,386,933 B1 | 6/2008 | Krounbi et al. |
| 7,389,577 B1 | 6/2008 | Shang et al. |
| 7,417,832 B1 | 8/2008 | Erickson et al. |
| 7,419,891 B1 | 9/2008 | Chen et al. |
| 7,428,124 B1 | 9/2008 | Song et al. |
| 7,430,098 B1 | 9/2008 | Song et al. |
| 7,436,620 B1 | 10/2008 | Kang et al. |
| 7,436,638 B1 | 10/2008 | Pan |
| 7,440,220 B1 | 10/2008 | Kang et al. |
| 7,443,632 B1 | 10/2008 | Stoev et al. |
| 7,444,740 B1 | 11/2008 | Chung et al. |
| 7,467,461 B2 | 12/2008 | Bonhote et al. |

(56) References Cited

U.S. PATENT DOCUMENTS

| | | | |
|---|---|---|---|
| 7,493,688 B1 | 2/2009 | Wang et al. |
| 7,508,626 B2 | 3/2009 | Ichihara et al. |
| 7,508,627 B1 | 3/2009 | Zhang et al. |
| 7,522,377 B1 | 4/2009 | Jiang et al. |
| 7,522,379 B1 | 4/2009 | Krounbi et al. |
| 7,522,382 B1 | 4/2009 | Pan |
| 7,542,246 B1 | 6/2009 | Song et al. |
| 7,551,406 B1 | 6/2009 | Thomas et al. |
| 7,552,523 B1 | 6/2009 | He et al. |
| 7,554,767 B1 | 6/2009 | Hu et al. |
| 7,558,019 B2 | 7/2009 | Le et al. |
| 7,583,466 B2 | 9/2009 | Kermiche et al. |
| 7,595,967 B1 | 9/2009 | Moon et al. |
| 7,639,450 B2 * | 12/2009 | Hsu et al. | 360/125.02 |
| 7,639,457 B1 | 12/2009 | Chen et al. |
| 7,649,712 B2 | 1/2010 | Le et al. |
| 7,660,080 B1 | 2/2010 | Liu et al. |
| 7,663,839 B2 | 2/2010 | Sasaki et al. |
| 7,672,080 B1 | 3/2010 | Tang et al. |
| 7,672,086 B1 | 3/2010 | Jiang |
| 7,684,160 B1 | 3/2010 | Erickson et al. |
| 7,688,546 B1 | 3/2010 | Bai et al. |
| 7,691,434 B1 | 4/2010 | Zhang et al. |
| 7,695,761 B1 | 4/2010 | Shen et al. |
| 7,715,152 B2 | 5/2010 | Okada et al. |
| 7,719,795 B2 | 5/2010 | Hu et al. |
| 7,726,009 B1 | 6/2010 | Liu et al. |
| 7,729,086 B1 | 6/2010 | Song et al. |
| 7,729,087 B1 | 6/2010 | Stoev et al. |
| 7,736,823 B1 | 6/2010 | Wang et al. |
| 7,768,743 B2 | 8/2010 | Guthrie et al. |
| 7,785,666 B1 | 8/2010 | Sun et al. |
| 7,796,356 B1 | 9/2010 | Fowler et al. |
| 7,800,858 B1 | 9/2010 | Bajikar et al. |
| 7,819,979 B1 | 10/2010 | Chen et al. |
| 7,829,264 B1 | 11/2010 | Wang et al. |
| 7,846,643 B1 | 12/2010 | Sun et al. |
| 7,855,854 B2 | 12/2010 | Hu et al. |
| 7,869,160 B1 | 1/2011 | Pan et al. |
| 7,872,824 B1 | 1/2011 | Macchioni et al. |
| 7,872,833 B2 | 1/2011 | Hu et al. |
| 7,889,456 B2 | 2/2011 | Jiang et al. |
| 7,894,159 B2 * | 2/2011 | Lengsfield et al. | 360/125.03 |
| 7,898,773 B2 | 3/2011 | Han et al. |
| 7,910,267 B1 | 3/2011 | Zeng et al. |
| 7,911,735 B1 | 3/2011 | Sin et al. |
| 7,911,737 B1 | 3/2011 | Jiang et al. |
| 7,916,426 B2 | 3/2011 | Hu et al. |
| 7,918,013 B1 | 4/2011 | Dunn et al. |
| 7,920,359 B2 | 4/2011 | Maruyama et al. |
| 7,968,219 B1 | 6/2011 | Jiang et al. |
| 7,979,978 B2 | 7/2011 | Han et al. |
| 7,982,989 B1 | 7/2011 | Shi et al. |
| 8,008,912 B1 | 8/2011 | Shang |
| 8,012,804 B1 | 9/2011 | Wang et al. |
| 8,015,692 B1 | 9/2011 | Zhang et al. |
| 8,018,677 B1 | 9/2011 | Chung et al. |
| 8,018,678 B1 | 9/2011 | Zhang et al. |
| 8,018,679 B2 | 9/2011 | Hsiao et al. |
| 8,023,231 B2 | 9/2011 | Guan et al. |
| 8,024,748 B1 | 9/2011 | Moravec et al. |
| 8,027,125 B2 | 9/2011 | Lee et al. |
| 8,035,930 B2 * | 10/2011 | Takano et al. | 360/319 |
| 8,051,552 B2 | 11/2011 | Jiang et al. |
| 8,066,892 B2 | 11/2011 | Guthrie et al. |
| 8,072,705 B1 | 12/2011 | Wang et al. |
| 8,074,345 B1 | 12/2011 | Anguelouch et al. |
| 8,077,418 B1 | 12/2011 | Hu et al. |
| 8,077,434 B1 | 12/2011 | Shen et al. |
| 8,077,435 B1 | 12/2011 | Liu et al. |
| 8,077,557 B1 | 12/2011 | Hu et al. |
| 8,079,135 B1 | 12/2011 | Shen et al. |
| 8,081,403 B1 | 12/2011 | Chen et al. |
| 8,091,210 B1 | 1/2012 | Sasaki et al. |
| 8,094,419 B2 | 1/2012 | Guan |
| 8,097,846 B1 | 1/2012 | Anguelouch et al. |
| 8,104,166 B1 | 1/2012 | Zhang et al. |
| 8,116,043 B2 | 2/2012 | Leng et al. |
| 8,116,171 B1 | 2/2012 | Lee |
| 8,117,738 B2 | 2/2012 | Han et al. |
| 8,120,874 B2 * | 2/2012 | Hsiao et al. | 360/119.04 |
| 8,125,732 B2 | 2/2012 | Bai et al. |
| 8,125,856 B1 | 2/2012 | Li et al. |
| 8,134,794 B1 | 3/2012 | Wang |
| 8,134,802 B2 | 3/2012 | Bai et al. |
| 8,136,224 B1 | 3/2012 | Sun et al. |
| 8,136,225 B1 | 3/2012 | Zhang et al. |
| 8,136,805 B1 | 3/2012 | Lee |
| 8,141,235 B1 | 3/2012 | Zhang |
| 8,146,236 B1 | 4/2012 | Luo et al. |
| 8,149,536 B1 | 4/2012 | Yang et al. |
| 8,151,441 B1 | 4/2012 | Rudy et al. |
| 8,163,185 B1 | 4/2012 | Sun et al. |
| 8,164,760 B2 | 4/2012 | Willis |
| 8,164,852 B2 | 4/2012 | Lee et al. |
| 8,164,855 B1 | 4/2012 | Gibbons et al. |
| 8,164,864 B2 | 4/2012 | Kaiser et al. |
| 8,165,709 B1 | 4/2012 | Rudy |
| 8,166,631 B1 | 5/2012 | Tran et al. |
| 8,166,632 B1 | 5/2012 | Zhang et al. |
| 8,169,473 B1 | 5/2012 | Yu et al. |
| 8,171,618 B1 | 5/2012 | Wang et al. |
| 8,179,636 B1 | 5/2012 | Bai et al. |
| 8,189,293 B1 | 5/2012 | Wakabayashi et al. |
| 8,191,237 B1 | 6/2012 | Luo et al. |
| 8,194,365 B1 | 6/2012 | Leng et al. |
| 8,194,366 B1 | 6/2012 | Li et al. |
| 8,196,285 B1 | 6/2012 | Zhang et al. |
| 8,200,054 B1 | 6/2012 | Li et al. |
| 8,203,800 B2 | 6/2012 | Li et al. |
| 8,208,350 B1 | 6/2012 | Hu et al. |
| 8,220,140 B1 | 7/2012 | Wang et al. |
| 8,222,599 B1 | 7/2012 | Chien |
| 8,223,458 B2 * | 7/2012 | Mochizuki et al. | 360/125.1 |
| 8,225,488 B1 | 7/2012 | Zhang et al. |
| 8,227,023 B1 | 7/2012 | Liu et al. |
| 8,228,633 B1 | 7/2012 | Tran et al. |
| 8,231,796 B1 | 7/2012 | Li et al. |
| 8,233,235 B2 | 7/2012 | Chen et al. |
| 8,233,248 B1 | 7/2012 | Li et al. |
| 8,238,059 B1 | 8/2012 | Tang et al. |
| 8,248,896 B1 | 8/2012 | Yuan et al. |
| 8,254,060 B1 | 8/2012 | Shi et al. |
| 8,257,597 B1 | 9/2012 | Guan et al. |
| 8,259,410 B1 | 9/2012 | Bai et al. |
| 8,259,539 B1 | 9/2012 | Hu et al. |
| 8,262,918 B1 | 9/2012 | Li et al. |
| 8,262,919 B1 | 9/2012 | Luo et al. |
| 8,264,797 B2 | 9/2012 | Emley |
| 8,264,798 B1 | 9/2012 | Guan et al. |
| 8,270,111 B2 | 9/2012 | Okada et al. |
| 8,270,126 B1 | 9/2012 | Roy et al. |
| 8,276,258 B1 | 10/2012 | Tran et al. |
| 8,277,669 B1 | 10/2012 | Chen et al. |
| 8,279,719 B1 | 10/2012 | Hu et al. |
| 8,284,516 B1 * | 10/2012 | Tang et al. | 360/125.03 |
| 8,284,517 B1 | 10/2012 | Sun et al. |
| 8,288,204 B1 | 10/2012 | Wang et al. |
| 8,289,647 B2 * | 10/2012 | Benakli et al. | 360/119.04 |
| 8,289,821 B1 | 10/2012 | Huber |
| 8,291,743 B1 | 10/2012 | Shi et al. |
| 8,307,539 B1 | 11/2012 | Rudy et al. |
| 8,307,540 B1 | 11/2012 | Tran et al. |
| 8,308,921 B1 | 11/2012 | Hiner et al. |
| 8,310,785 B1 | 11/2012 | Zhang et al. |
| 8,310,901 B1 | 11/2012 | Batra et al. |
| 8,315,019 B1 | 11/2012 | Mao et al. |
| 8,316,527 B2 | 11/2012 | Hong et al. |
| 8,320,076 B1 | 11/2012 | Shen et al. |
| 8,320,077 B1 | 11/2012 | Tang et al. |
| 8,320,219 B1 | 11/2012 | Wolf et al. |
| 8,320,220 B1 | 11/2012 | Yuan et al. |
| 8,320,722 B1 | 11/2012 | Yuan et al. |
| 8,322,022 B1 | 12/2012 | Yi et al. |

(56) References Cited

U.S. PATENT DOCUMENTS

| | | | |
|---|---|---|---|
| 8,322,023 B1 | 12/2012 | Zeng et al. | |
| 8,325,569 B1 | 12/2012 | Shi et al. | |
| 8,333,008 B1 | 12/2012 | Sin et al. | |
| 8,334,093 B2 | 12/2012 | Zhang et al. | |
| 8,336,194 B2 | 12/2012 | Yuan et al. | |
| 8,339,734 B2 * | 12/2012 | Pentek et al. | 360/119.03 |
| 8,339,738 B1 | 12/2012 | Tran et al. | |
| 8,341,826 B1 | 1/2013 | Jiang et al. | |
| 8,343,319 B1 | 1/2013 | Li et al. | |
| 8,343,364 B1 | 1/2013 | Gao et al. | |
| 8,345,383 B2 | 1/2013 | Yan et al. | |
| 8,349,195 B1 | 1/2013 | Si et al. | |
| 8,351,307 B1 | 1/2013 | Wolf et al. | |
| 8,357,244 B1 | 1/2013 | Zhao et al. | |
| 8,373,945 B1 | 2/2013 | Luo et al. | |
| 8,375,564 B1 | 2/2013 | Luo et al. | |
| 8,375,565 B2 | 2/2013 | Hu et al. | |
| 8,381,391 B2 | 2/2013 | Park et al. | |
| 8,385,020 B2 * | 2/2013 | Min | 360/125.3 |
| 8,385,157 B1 | 2/2013 | Champion et al. | |
| 8,385,158 B1 | 2/2013 | Hu et al. | |
| 8,394,280 B1 | 3/2013 | Wan et al. | |
| 8,400,731 B1 | 3/2013 | Li et al. | |
| 8,400,733 B2 | 3/2013 | Shin et al. | |
| 8,404,128 B1 | 3/2013 | Zhang et al. | |
| 8,404,129 B1 | 3/2013 | Luo et al. | |
| 8,405,930 B1 | 3/2013 | Li et al. | |
| 8,409,453 B1 | 4/2013 | Jiang et al. | |
| 8,413,317 B1 | 4/2013 | Wan et al. | |
| 8,416,540 B1 | 4/2013 | Li et al. | |
| 8,419,953 B1 | 4/2013 | Su et al. | |
| 8,419,954 B1 | 4/2013 | Chen et al. | |
| 8,422,176 B1 | 4/2013 | Leng et al. | |
| 8,422,342 B1 | 4/2013 | Lee | |
| 8,422,841 B1 | 4/2013 | Shi et al. | |
| 8,424,192 B1 | 4/2013 | Yang et al. | |
| 8,441,756 B1 | 5/2013 | Sun et al. | |
| 8,443,510 B1 | 5/2013 | Shi et al. | |
| 8,444,866 B1 | 5/2013 | Guan et al. | |
| 8,449,948 B2 | 5/2013 | Medina et al. | |
| 8,451,556 B1 | 5/2013 | Wang et al. | |
| 8,451,563 B1 | 5/2013 | Zhang et al. | |
| 8,454,846 B1 | 6/2013 | Zhou et al. | |
| 8,455,119 B1 | 6/2013 | Jiang et al. | |
| 8,456,778 B2 | 6/2013 | Min et al. | |
| 8,456,961 B1 | 6/2013 | Wang et al. | |
| 8,456,963 B1 | 6/2013 | Hu et al. | |
| 8,456,964 B1 | 6/2013 | Yuan et al. | |
| 8,456,966 B1 | 6/2013 | Shi et al. | |
| 8,456,967 B1 | 6/2013 | Mallary | |
| 8,458,892 B2 | 6/2013 | Si et al. | |
| 8,462,592 B1 | 6/2013 | Wolf et al. | |
| 8,468,682 B1 | 6/2013 | Zhang | |
| 8,470,186 B2 | 6/2013 | Chen et al. | |
| 8,472,288 B1 | 6/2013 | Wolf et al. | |
| 8,480,911 B1 | 7/2013 | Osugi et al. | |
| 8,486,285 B2 | 7/2013 | Zhou et al. | |
| 8,486,286 B1 | 7/2013 | Gao et al. | |
| 8,488,272 B1 | 7/2013 | Tran et al. | |
| 8,491,801 B1 | 7/2013 | Tanner et al. | |
| 8,491,802 B1 | 7/2013 | Gao et al. | |
| 8,493,693 B1 | 7/2013 | Zheng et al. | |
| 8,493,695 B1 | 7/2013 | Kaiser et al. | |
| 8,495,813 B1 | 7/2013 | Hu et al. | |
| 8,498,079 B1 | 7/2013 | Song et al. | |
| 8,498,084 B1 | 7/2013 | Leng et al. | |
| 8,506,828 B1 | 8/2013 | Osugi et al. | |
| 8,514,517 B1 | 8/2013 | Batra et al. | |
| 8,518,279 B1 | 8/2013 | Wang et al. | |
| 8,518,832 B1 | 8/2013 | Yang et al. | |
| 8,520,336 B1 | 8/2013 | Liu et al. | |
| 8,520,337 B1 | 8/2013 | Liu et al. | |
| 8,520,366 B2 | 8/2013 | Summey et al. | |
| 8,524,068 B2 | 9/2013 | Medina et al. | |
| 8,526,275 B1 | 9/2013 | Yuan et al. | |
| 8,531,801 B1 | 9/2013 | Xiao et al. | |
| 8,532,450 B1 | 9/2013 | Wang et al. | |
| 8,533,937 B1 | 9/2013 | Wang et al. | |
| 8,537,494 B1 | 9/2013 | Pan et al. | |
| 8,537,495 B1 | 9/2013 | Luo et al. | |
| 8,537,502 B1 | 9/2013 | Park et al. | |
| 8,542,461 B2 | 9/2013 | Bai et al. | |
| 8,545,999 B1 | 10/2013 | Leng et al. | |
| 8,547,659 B1 | 10/2013 | Bai et al. | |
| 8,547,667 B1 | 10/2013 | Roy et al. | |
| 8,547,730 B1 | 10/2013 | Shen et al. | |
| 8,553,359 B2 * | 10/2013 | Yamada et al. | 360/125.02 |
| 8,555,486 B1 | 10/2013 | Medina et al. | |
| 8,559,141 B1 | 10/2013 | Pakala et al. | |
| 8,563,146 B1 | 10/2013 | Zhang et al. | |
| 8,565,049 B1 | 10/2013 | Tanner et al. | |
| 8,570,686 B2 * | 10/2013 | Hosomi et al. | 360/125.3 |
| 8,576,517 B1 | 11/2013 | Tran et al. | |
| 8,578,594 B2 | 11/2013 | Jiang et al. | |
| 8,582,238 B1 | 11/2013 | Liu et al. | |
| 8,582,241 B1 | 11/2013 | Yu et al. | |
| 8,582,253 B1 | 11/2013 | Zheng et al. | |
| 8,588,039 B1 | 11/2013 | Shi et al. | |
| 8,593,914 B2 | 11/2013 | Wang et al. | |
| 8,597,528 B1 | 12/2013 | Roy et al. | |
| 8,599,520 B1 | 12/2013 | Liu et al. | |
| 8,599,657 B1 | 12/2013 | Lee | |
| 8,603,593 B1 | 12/2013 | Roy et al. | |
| 8,607,438 B1 | 12/2013 | Gao et al. | |
| 8,607,439 B1 | 12/2013 | Wang et al. | |
| 8,611,035 B1 | 12/2013 | Bajikar et al. | |
| 8,611,046 B2 * | 12/2013 | Wu et al. | 360/125.3 |
| 8,611,054 B1 | 12/2013 | Shang et al. | |
| 8,611,055 B1 | 12/2013 | Pakala et al. | |
| 8,614,860 B2 | 12/2013 | Han et al. | |
| 8,614,864 B1 | 12/2013 | Hong et al. | |
| 8,619,512 B1 | 12/2013 | Yuan et al. | |
| 8,625,233 B1 | 1/2014 | Ji et al. | |
| 8,625,235 B2 | 1/2014 | Takano et al. | |
| 8,625,941 B1 | 1/2014 | Shi et al. | |
| 8,628,672 B1 | 1/2014 | Si et al. | |
| 8,630,068 B1 | 1/2014 | Mauri et al. | |
| 8,634,280 B1 | 1/2014 | Wang et al. | |
| 8,638,529 B1 | 1/2014 | Leng et al. | |
| 8,643,980 B1 | 2/2014 | Fowler et al. | |
| 8,649,123 B1 | 2/2014 | Zhang et al. | |
| 8,665,561 B1 | 3/2014 | Knutson et al. | |
| 8,670,211 B1 | 3/2014 | Sun et al. | |
| 8,670,213 B1 | 3/2014 | Zeng et al. | |
| 8,670,214 B1 | 3/2014 | Knutson et al. | |
| 8,670,294 B1 | 3/2014 | Shi et al. | |
| 8,670,295 B1 | 3/2014 | Hu et al. | |
| 8,675,318 B1 | 3/2014 | Ho et al. | |
| 8,675,455 B1 | 3/2014 | Krichevsky et al. | |
| 8,681,594 B1 | 3/2014 | Shi et al. | |
| 8,689,430 B1 | 4/2014 | Chen et al. | |
| 8,693,141 B1 | 4/2014 | Elliott et al. | |
| 8,703,397 B1 | 4/2014 | Zeng et al. | |
| 8,705,205 B1 | 4/2014 | Li et al. | |
| 8,705,206 B1 * | 4/2014 | Maeda et al. | 360/125.3 |
| 8,711,518 B1 | 4/2014 | Zeng et al. | |
| 8,711,528 B1 | 4/2014 | Xiao et al. | |
| 8,717,709 B1 | 5/2014 | Shi et al. | |
| 8,720,044 B1 | 5/2014 | Tran et al. | |
| 8,721,902 B1 | 5/2014 | Wang et al. | |
| 8,724,258 B2 | 5/2014 | Zhang et al. | |
| 8,724,259 B1 | 5/2014 | Liu et al. | |
| 8,749,790 B1 | 6/2014 | Tanner et al. | |
| 8,749,920 B1 | 6/2014 | Knutson et al. | |
| 8,753,903 B1 | 6/2014 | Tanner et al. | |
| 8,760,807 B1 | 6/2014 | Zhang et al. | |
| 8,760,818 B1 | 6/2014 | Diao et al. | |
| 8,760,819 B1 | 6/2014 | Liu et al. | |
| 8,760,822 B1 | 6/2014 | Li et al. | |
| 8,760,823 B1 | 6/2014 | Chen et al. | |
| 8,763,235 B1 | 7/2014 | Wang et al. | |
| 8,780,498 B1 | 7/2014 | Jiang et al. | |
| 8,780,505 B1 | 7/2014 | Xiao | |
| 8,786,983 B1 | 7/2014 | Liu et al. | |

(56) References Cited

U.S. PATENT DOCUMENTS

| | | |
|---|---|---|
| 8,790,524 B1 | 7/2014 | Luo et al. |
| 8,790,527 B1 | 7/2014 | Luo et al. |
| 8,792,208 B1 | 7/2014 | Liu et al. |
| 8,792,312 B1 | 7/2014 | Wang et al. |
| 8,793,866 B1 | 8/2014 | Zhang et al. |
| 8,797,680 B1 | 8/2014 | Luo et al. |
| 8,797,684 B1 | 8/2014 | Tran et al. |
| 8,797,686 B1 | 8/2014 | Bai et al. |
| 8,797,692 B1 | 8/2014 | Guo et al. |
| 8,810,964 B2 * | 8/2014 | Gao et al. .................. 360/125.3 |
| 8,813,324 B2 | 8/2014 | Emley et al. |
| 8,830,625 B2 * | 9/2014 | Linville et al. ............ 360/125.3 |
| 8,848,317 B2 * | 9/2014 | Shiimoto et al. ........... 360/125.3 |
| 8,964,331 B2 * | 2/2015 | Sugiyama et al. ......... 360/125.1 |
| 8,964,332 B1 * | 2/2015 | Katada et al. .............. 360/125.3 |
| 2003/0076630 A1 | 4/2003 | Sato et al. |
| 2004/0184191 A1 | 9/2004 | Ichihara et al. |
| 2005/0117251 A1 | 6/2005 | Matono et al. |
| 2006/0044681 A1 | 3/2006 | Le et al. |
| 2006/0044682 A1 | 3/2006 | Le et al. |
| 2006/0067005 A1 | 3/2006 | Jayasekara |
| 2006/0082924 A1 | 4/2006 | Etoh et al. |
| 2007/0253107 A1 | 11/2007 | Mochizuki et al. |
| 2008/0002309 A1 | 1/2008 | Hsu et al. |
| 2008/0151437 A1 | 6/2008 | Chen et al. |
| 2008/0180861 A1 | 7/2008 | Maruyama et al. |
| 2008/0253035 A1 | 10/2008 | Han et al. |
| 2008/0273276 A1 | 11/2008 | Guan |
| 2008/0273277 A1 | 11/2008 | Guan et al. |
| 2008/0278861 A1 | 11/2008 | Jiang et al. |
| 2008/0304186 A1 | 12/2008 | Watanabe et al. |
| 2009/0002896 A1 * | 1/2009 | Mallary et al. ................ 360/319 |
| 2009/0091861 A1 | 4/2009 | Takano et al. |
| 2009/0154019 A1 | 6/2009 | Hsiao et al. |
| 2009/0154026 A1 | 6/2009 | Jiang et al. |
| 2009/0168241 A1 | 7/2009 | Mochizuki et al. |
| 2009/0279206 A1 | 11/2009 | Yang et al. |
| 2010/0061016 A1 | 3/2010 | Han et al. |
| 2010/0146773 A1 | 6/2010 | Li et al. |
| 2010/0155363 A1 | 6/2010 | Pentek et al. |
| 2010/0254042 A1 | 10/2010 | Contreras et al. |
| 2010/0290157 A1 | 11/2010 | Zhang et al. |
| 2010/0302681 A1 | 12/2010 | Mino et al. |
| 2011/0051293 A1 | 3/2011 | Bai et al. |
| 2011/0075299 A1 | 3/2011 | Olson et al. |
| 2011/0086240 A1 | 4/2011 | Xiang et al. |
| 2011/0102942 A1 * | 5/2011 | Bai et al. .................. 360/125.03 |
| 2011/0146060 A1 | 6/2011 | Han et al. |
| 2011/0151279 A1 | 6/2011 | Allen et al. |
| 2011/0222188 A1 | 9/2011 | Etoh et al. |
| 2011/0242707 A1 * | 10/2011 | Yoon et al. .................. 360/294.1 |
| 2012/0012555 A1 | 1/2012 | Yan et al. |
| 2012/0044598 A1 | 2/2012 | Bai et al. |
| 2012/0111826 A1 | 5/2012 | Chen et al. |
| 2012/0216378 A1 | 8/2012 | Emley et al. |
| 2012/0237878 A1 | 9/2012 | Zeng et al. |
| 2012/0257305 A1 | 10/2012 | Tang et al. |
| 2012/0298621 A1 | 11/2012 | Gao |
| 2013/0016443 A1 * | 1/2013 | de la Fuente et al. ..... 360/123.12 |
| 2013/0216702 A1 | 8/2013 | Kaiser et al. |
| 2013/0216863 A1 | 8/2013 | Li et al. |
| 2013/0257421 A1 | 10/2013 | Shang et al. |
| 2013/0342937 A1 | 12/2013 | Sugiyama et al. |
| 2014/0016232 A1 | 1/2014 | Guan |
| 2014/0078619 A1 | 3/2014 | Song et al. |
| 2014/0154529 A1 | 6/2014 | Yang et al. |
| 2014/0175050 A1 | 6/2014 | Zhang et al. |
| 2014/0177091 A1 * | 6/2014 | Urakami et al. ................. 360/75 |

OTHER PUBLICATIONS

Jinqiu Zhang, et al., U.S. Appl. No. 14/046,790, filed Oct. 4, 2013, 26 pages.

Mallary et al., "One Terabit per Square Inch Perpendicular Recording Conceptual Design", IEEE Transactions on Magnetics, vol. 38, No. 4, Jul. 2002, pp. 1719-1724.

* cited by examiner

MAGNETIC WRITER HAVING A DUAL SIDE GAP

BACKGROUND

Figure 1A:
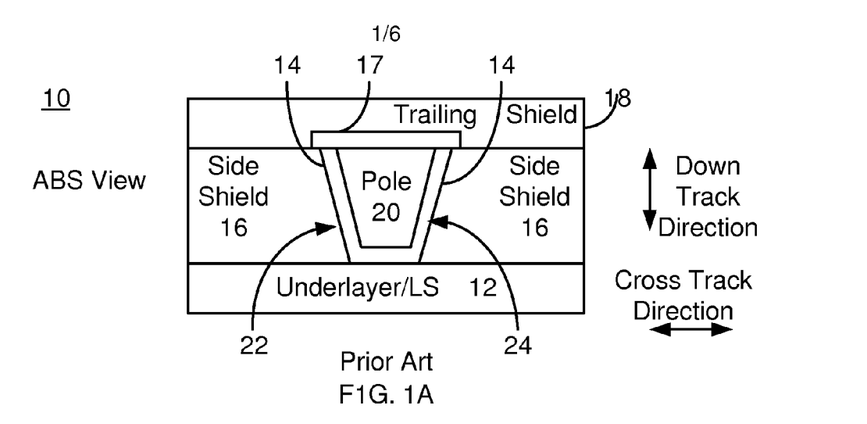
FIGS. 1A-1B depict ABS and plan views of a conventional magnetic recording head.
Figure 1B:
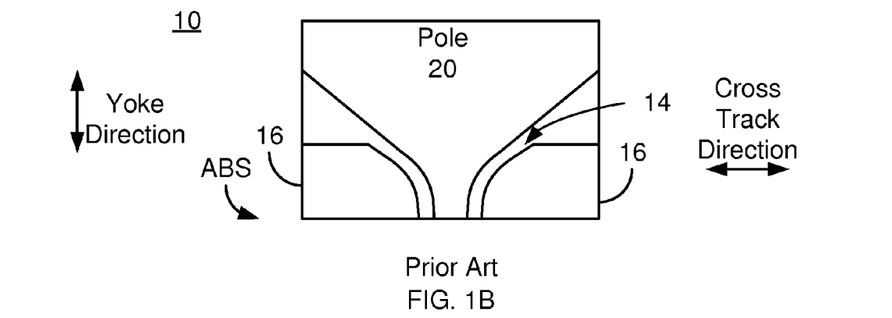

FIGS. 1A and 1B depict air-bearing surface (ABS) and plan views of a conventional magnetic recording head 10. The magnetic recording transducer 10 may be a perpendicular magnetic recording (PMR) head. The conventional magnetic recording transducer 10 may be a part of a merged head including the write transducer 10 and a read transducer (not shown). Alternatively, the magnetic recording head may be a write head including only the write transducer 10. The conventional transducer 10 includes an underlayer 12 that may include a leading shield, side gap 14, side shields 16, top (write) gap 17, optional top shield 18 and main pole 20.

The side shields 16 are separated from the main pole 20 by a side gap 14. The side shields 16 extend a distance back from the ABS. The gap 14 between the side shields 16 and the main pole 20 may have a substantially constant thickness. Thus, the side shields 16 are conformal with the main pole 20.

The main pole 20 resides on an underlayer 12 and includes sidewalls 22 and 24. The underlayer 12 may include a leading shield. The sidewalls 22 and 24 of the conventional main pole 20 form an angle with the down track direction at the ABS. Thus, the top of the main pole 20 is wider than its bottom. In addition, sidewalls of the pole tip forms a chisel angle with the yoke direction (i.e. perpendicular to the ABS) at and near the ABS. Typically, the chisel angle is constant at and near the ABS.

Although the transducer 10 functions, performance of the transducer 10 may suffer at higher recording densities. For example, in the range of close to or above one $Tb/in^2$, the main pole 20, side gaps 14 and side shields 16 are scaled down in size. In this size range, the conventional transducer 10 suffers from a reduced write field. Further, reductions in the depth of the side shields 16 in the yoke direction (perpendicular to the plane of the page in FIG. 1A) may result in a significant increase in the wide area track erasure. Thus, performance of the conventional transducer 10 may suffer at higher recording densities.

DETAILED DESCRIPTION OF THE PREFERRED EMBODIMENTS

Figure 2A:
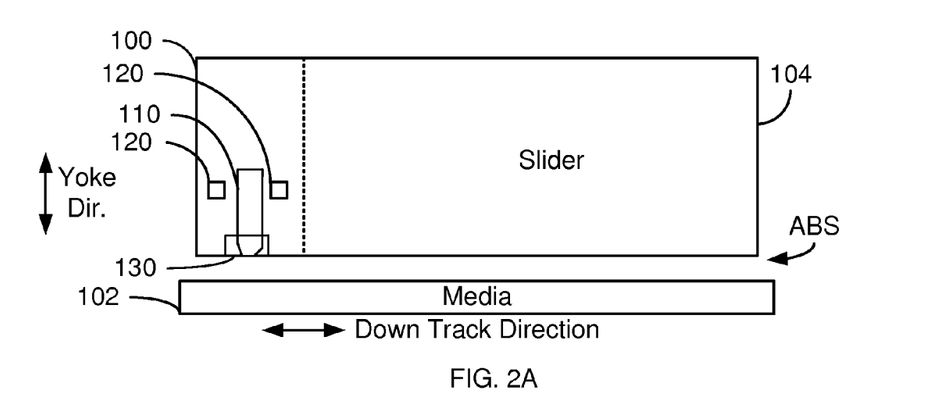
FIGS. 2A, 2B and 2C depict side, ABS and plan views of an exemplary embodiment of a magnetic recording disk drive and transducer having a dual side gap.
Figure 2B:
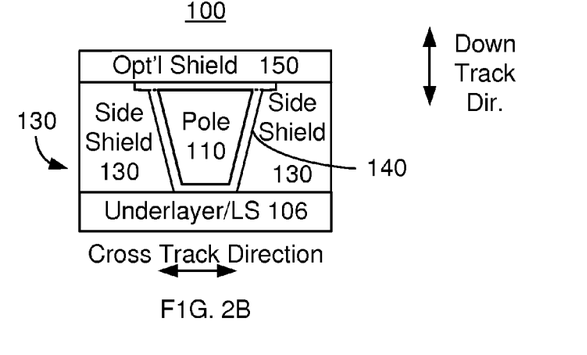
Figure 2C:
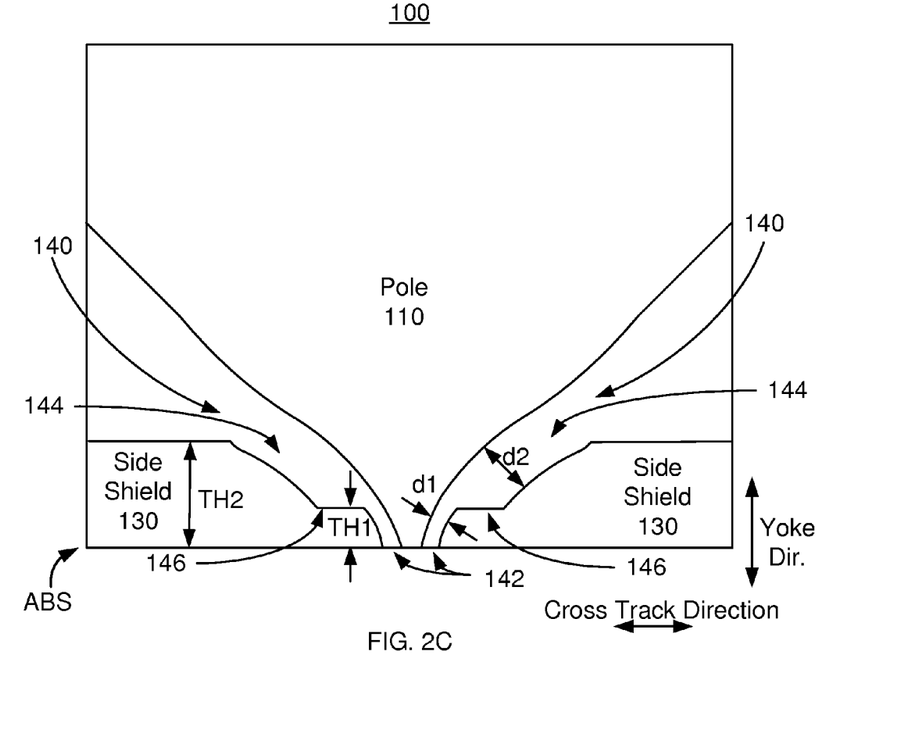

FIGS. 2A, 2B and 2C depict various views of an exemplary embodiment of a disk drive and transducer 100. FIG. 2A depicts a side view of the disk drive. FIGS. 2B and 2C depict ABS and plan views of portions of the transducer 100. For clarity, FIGS. 2A-2C are not to scale. For simplicity not all portions of the disk drive and transducer 100 are shown. In addition, although the disk drive and transducer 100 are depicted in the context of particular components other and/or different components may be used. For example, circuitry used to drive and control various portions of the disk drive is not shown. For simplicity, only single components are shown. However, multiples of each components and/or their sub-components, might be used. The disk drive may be a perpendicular magnetic recording (PMR) disk drive. However, in other embodiments, the disk drive 200 may be configured for other types of magnetic recording included but not limited to heat assisted magnetic recording (HAMR).

The disk drive includes a media 102, and a slider 104 on which a transducer 100 has been fabricated. Although not shown, the slider 104 and thus the transducer 100 are generally attached to a suspension. In general, the slider 104 includes the write transducer 100 and a read transducer (not shown). However, for clarity, only the write transducer 100 is shown.

The transducer 100 includes an underlayer 106, a main pole 110, coil(s) 120, side shields 130, side gap 140 and optional trailing shield 150. The underlayer 106 may include a leading shield (LS) at and near the ABS. In other embodiments, the leading shield may be omitted. The coil(s) 120 are used to energize the main pole 110. One turn is depicted in FIG. 2A. Another number of turns may, however, be used. Typically, multiple turns are used. Note that only a portion of the coil(s) 120 may be shown in FIG. 2A. If, for example, the coil(s) 120 is a spiral, or pancake, coil, then additional portions of the coil(s) 120 may be located further from the ABS. Alternatively a helical may be used. Further, additional coils may also be used.

The main pole 110 is shown as having a top wider than the bottom. The main pole 110 thus includes sidewalls having sidewall angles that are greater than or equal to zero. In an embodiment, these sidewall angles differ at different distances from the ABS. In other embodiments, other geometries may be used. For example, the top may be the same size as or smaller than the bottom. The main pole 110 is depicted as having a trapezoidal shape including a flat bottom. In other embodiment, the main pole 110 may have another shape. For example, the main pole 110 may have a triangular cross section at the ABS, with a flat trailing edge facing the optional shield 150 and a vertex closest to the underlayer/leading shield 106. In some embodiments, the main pole 110 may have leading surface bevel and/or a trailing surface bevel. Thus, the main pole 110 may be shorter in the down track direction at the ABS than at location(s) recessed from the ABS.

The transducer 100 also includes magnetic side shields 130 and nonmagnetic side gap 140. The side shields 130 may be magnetically and, in some embodiments, physically connected with the trailing shield 150 and leading shield of the underlayer 106. In such embodiments, a full wraparound shield is formed. In other embodiments, the side shields 130 may be physically and/or magnetically disconnected from the trailing shield 150 and/or the leading shield of the underlayer 106. Further, the shields 106, 130 and/or 150 may be configured differently. In some embodiments, the shield(s) 106 and/or 150 may be omitted. The side shields 130 are also depicted as symmetric in the cross track direction. In other embodiments, asymmetries in the cross track direction may be present.

The side gap 140 may include one or more sublayers as well as a seed layer. Further, although depicted as a single gap surrounding the main pole 110, the gap 140 may include separate side gaps (between the main pole 110 and side shields 130) and write gap (between the main pole 110 and trailing shield 150). In addition, although depicted as symmetric, the gap 140 may be asymmetric. For example, the gap between a side of the main pole 110 and one side shield may be wider than the gap between the opposite side of the main pole 110 and the other side shield.

As can be seen in FIG. 2C, the side shields 130 and side gap 140 are configured such that the side gap 140 includes a first side gap 142 and a second side gap 144. The side shield 130 is conformal with the pole 110 for both side gaps 142 and 144. The first side gap 142 is between the second side gap 144 and the ABS. Between these two side gaps 142 and 144, is plateau 146. The side gap 142 has a width d1, while the second side gap 144 has a width d2 that is different from d1 (d1≠d2). In the embodiment shown, the first side gap 142 is narrower than the second side gap 144 (d1<d2).

As discussed below, the widths d1 and d2 of the side gaps 142 and 144, respectively, may depend upon the distance the side gaps 142 and 144, respectively, extend into the ABS. In some embodiments, the width of the second side gap 144 is at least twice the width of the first side gap 142 (d2≥2*d1). In some such embodiments, the second side gap 144 width is at least three multiplied by the first side gap 142 width (d2≥3*d1). In some embodiments, the width of the second side gap 144 is at least four multiplied by the width of the first side gap 142 (d2≥4*d1). In some embodiments, the second side gap 144 width is not more than sixty nanometers greater than the first side gap width (d1+60 nm≥d2). In some such embodiments, the second side gap 144 width is not more than forty nanometers greater than the first side gap width and not less than thirty nanometers greater than the first side gap width (d1+40 nm≥d2≥d1+30 nm). In general, the smaller the first side gap 142, the larger the difference between the first side gap 142 width and the second side gap 144 width. For example, if the first side gap 142 has a width d1 of approximately forty nanometers, then the second side gap 144 may have a width d2 of at least twice and not more than three times the first side gap width. If the first side gap 142 is smaller, then the difference between the widths may be greater. For example, if the first side gap 142 has a width d1 of thirty nanometers, then the second side gap 144 may have a width d2 that is at least three times and not more than four times the first side gap 142 width. Other configurations including other relationships between the side gap widths are possible.

The side gaps 142 and 144 are also desired to be narrow. The first side gap 142 may be not more than sixty nanometers wide and greater than zero nanometers wide. In some embodiments, the width of the first side gap 142 is not more than forty nanometers. In some such embodiments, the first side gap 142 may be not more than twenty nanometers wide.

The first side gap 142 is also desired to extend only a limited distance from the ABS in the yoke direction. The distance the first side gap 142 extends from the ABS in the yoke direction is a first throat height, TH1. The depth of the side shields 130 where the second gap 144 terminates is a second throat height, TH2. In some embodiments, the first throat height is not more than one hundred nanometers (TH1≤100 nm). For example 50 nanometers≤TH1≤100 nanometers in some cases. However, in some such embodiments, the first side gap 142 may terminate less than or equal to fifty nanometers from the ABS in the yoke direction (TH1≤50 nm). The first side gap 142 may also be desired to terminate at least twenty nanometers from the ABS (20 nm≤TH1). The second throat height TH2 is the depth of the side shields in the embodiment shown in FIGS. 2A-2C. In some embodiments, the second throat height is not more than six hundred nanometers. Thus, the side shields 130 may terminate not more than six hundred nanometers from the ABS. In other embodiments, the second throat height may be smaller. For example, in some embodiments, TH2 is not greater than four hundred fifty nanometers.

The first side gap 142 may be desired to extend only a limited distance from the ABS because wide area track erasure (WATER) may be adversely affected by a deeper first side gap 142. For example, if the second side gap 144 were eliminated, the first side gap 142 may extend to the back of the side shields 130, which may be six hundred nanometers from the ABS. Such a transducer may suffer the drawbacks described above including WATER. In contrast, if the first side gap 142 terminates at too small a distance from the ABS, then the track width and adjacent track interference (ATI) may increase. To mitigate both issues, the first side gap 142 is present and narrow, but may extend only a limited distance from the ABS.

The side gap 140 also includes a plateau 146 between the first side gap 142 and the second side gap 144. The plateau 146 may be configured to be just wide enough to cover the distance between the widths d1 and d2 of the side gaps 142 and 144. In the embodiment shown, the plateau 146 has an edge along the side shield 130 that is substantially parallel to the ABS. In other embodiments, other configurations are possible. For example, the edge of the plateau 146 adjoining the side shield 130 may be at an angle of not more than forty degrees from the ABS. In some such embodiments, this angle is not more than twenty degrees. Further, this angle may not exceed ten degrees.

The magnetic transducer 100 may have improved performance, particularly at higher recording densities. The dual conformal side gap 140 allows for improved writability of the main pole 110 while addressing WATER issues that might otherwise render the transducer unusable. In particular, the narrow, conformal first side gap 142 at and near the ABS may allow for narrower track widths and writing at higher areal densities. The addition of the second conformal side gap 144 recessed from the ABS may improve flux shunting and WATER. Thus, overall performance of the transducer 100 may be improved at higher areal densities.

Figure 3:
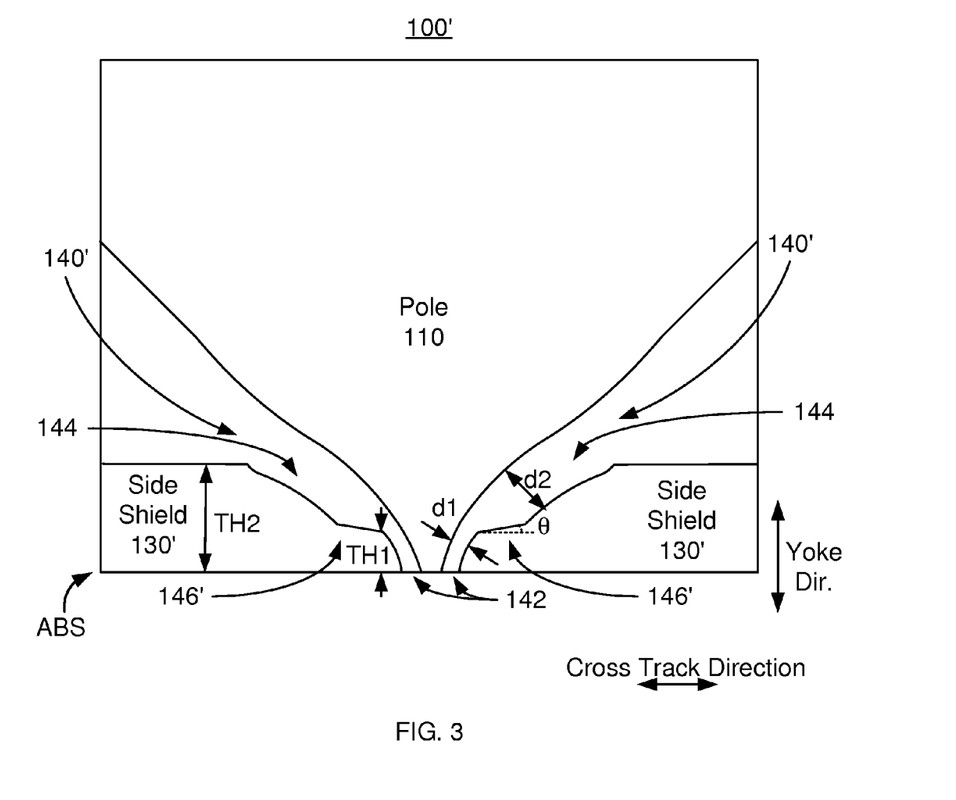
FIG. 3 depicts another exemplary embodiment of a magnetic recording transducer having a dual side gap.

FIG. 3 depicts a plan view of another exemplary embodiment of the magnetic recording apparatus, or transducer 100'. For clarity, FIG. 3 is not to scale. For simplicity not all portions of the transducer 100' are shown. In addition, although the transducer 100' is depicted in the context of particular components other and/or different components may be used. For example, circuitry used to drive and control various portions of the disk drive is not shown. For simplicity, only single components are shown. However, multiples of each components and/or their sub-components, might be used. The disk drive may be a PMR disk drive. However, in other embodiments, the disk drive may be configured for other types of magnetic recording included but not limited to HAMR. Because the transducer 100' is analogous to the transducer 100, similar components have similar labels. Thus, the transducer 100' includes a side gap 140', main pole 110 and side shields 130' that are analogous to the side gap 140, the main pole 110 and the side shields 130, respectively.

The side shields 130' may be magnetically and, in some embodiments, physically connected with the trailing shield (not shown in FIG. 3) and leading shield (not shown in FIG. 3) of the underlayer (not shown in FIG. 3). In such embodiments, a full wraparound shield is formed. In other embodiments, the side shields 130' may be physically and/or magnetically disconnected from the trailing shield and/or the leading shield of the underlayer. The side shields 130' and side gap 140' are also depicted as symmetric in the cross track direction. In other embodiments, asymmetries in the cross track direction may be present.

The side gap 140' includes a first side gap 142, a second side gap 144 and a plateau 146' that are analogous to the first side gap 142, the second side gap 144 and the plateau 146. Thus, the widths d1 and d2 of the side gaps 142 and 144, respectively, as well as the throat heights TH1 and TH2 for the side gaps 142 and 144, respectively, may be configured as described above. However the plateau 146' is explicitly depicted as being at an angle, θ, from parallel to the ABS. The plateau 146' may be configured to be just wide enough to cover the distance between the widths d1 and d2 of the side gaps 142 and 144 at the angle θ. The plateau 146' may be at an angle θ of not more than forty degrees from the ABS. In some embodiments, θ is not more than twenty degrees. In some such embodiments, θ may not exceed ten degrees. In embodiments in which the angle θ is zero degrees, the edge of the plateau 146' is substantially parallel to the ABS.

The magnetic transducer 100' may share the benefits of the magnetic transducer 100. In particular, the magnetic transducer 100' may have improved performance at higher recording densities. Improved writability of the main pole 110 may be achieved while addressing WATER and/or ATI issues. Thus, overall performance of the transducer 100' may be improved at higher areal densities.

Figure 4:
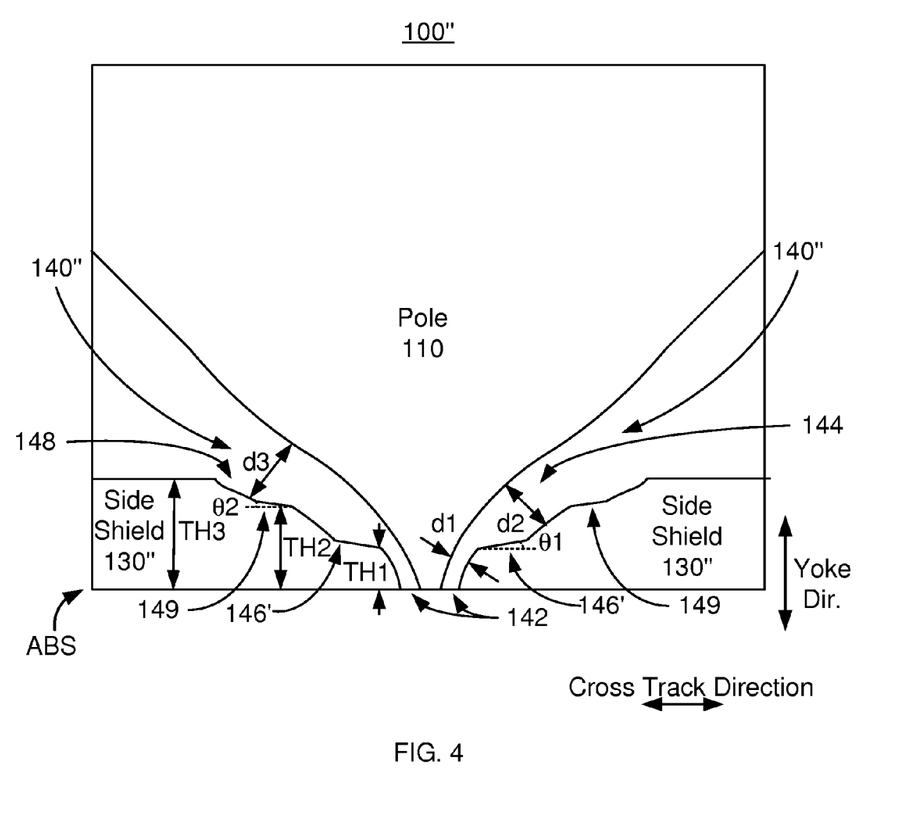
FIG. 4 depicts another exemplary embodiment of a magnetic recording transducer having a dual side gap.

FIG. 4 depicts a plan view of another exemplary embodiment of the magnetic recording apparatus, or transducer 100". For clarity, FIG. 4 is not to scale. For simplicity not all portions of the transducer 100" are shown. In addition, although the transducer 100" is depicted in the context of particular components other and/or different components may be used. For example, circuitry used to drive and control various portions of the disk drive is not shown. For simplicity, only single components are shown. However, multiples of each components and/or their sub-components, might be used. The disk drive may be a PMR disk drive. However, in other embodiments, the disk drive may be configured for other types of magnetic recording included but not limited to HAMR. Because the transducer 100" is analogous to the transducer(s) 100 and/or 100', similar components have similar labels. Thus, the transducer 100" includes a side gap 140", main pole 110 and side shields 130" that are analogous to the side gap 140/140', the main pole 110 and the side shields 130/130', respectively.

The side shields 130" may be magnetically and, in some embodiments, physically connected with the trailing shield and leading shield. In such embodiments, a full wraparound shield is formed. In other embodiments, the side shields 130" may be physically and/or magnetically disconnected from the trailing shield and/or the leading shield of the underlayer. The side shields 130" and side gap 140" are also depicted as symmetric in the cross track direction. In other embodiments, asymmetries in the cross track direction may be present.

The side gap 140" includes a first side gap 142, a second side gap 144 and a plateau 146" that are analogous to the first side gap 142, the second side gap 144 and the plateau 146/146'. Thus, the widths d1 and d2 of the side gaps 142 and 144, respectively, as well as the throat heights TH1 and TH2 for the side gaps 142 and 144, respectively, may be configured as described above. The plateau 146' is explicitly depicted as being at an angle, θ1, from parallel to the ABS. This angle θ1 is analogous to the angle θ described above and may be configured similarly.

In addition, the side shields 130" and side gap 140" are configured such that the side gap 140" includes a third side gap 148 and a third plateau 149. Like the first side gap 142 and second side gap 144, the third side gap 148 is conformal with the main pole 110. The third side gap 148 has a width, d3, that is different from the widths d1 and d2 of the first side gap 142 and second side gap 144, respectively. In the embodiment shown, the width of the third side gap 148 is greater than the width of the second side gap 144 (d3>d2). Consequently, the third side gap 148 width is greater than the first side gap 142 width (d3>d1). In other embodiments, however, the third side gap 148 might be less wide than the second side gap 144. The third side gap extends to the third throat height TH3. In some embodiments, the third throat height does not exceed six hundred nanometers. The third throat height is also greater than the second throat height (TH3>TH2), as shown in FIG. 4.

The plateau 149 may be configured to be just wide enough to cover the distance between the widths d2 and d3 of the side gaps 144 and 148 at the angle θ2. The angle θ2 may be zero degrees and may be in the same range as the angles θ and θ1. In some embodiments, therefore, the edge of the plateau 149 formed by the wall of the side shield 130" may be parallel to the ABS. In other embodiments, the plateau 149 may be at an angle θ2 of not more than forty degrees from the ABS. In some embodiments, θ2 is not more than twenty degrees. In some such embodiments, θ2 may not exceed ten degrees. Although three gaps 142, 144 and 148 are shown, in another embodiment, additional gaps may be included.

The magnetic transducer 100" may share the benefits of the magnetic transducer 100 and/or 100'. In particular, the magnetic transducer 100" may have improved performance at higher recording densities. Improved writability of the main pole 110 may be achieved while addressing WATER and/or ATI issues. Thus, overall performance of the transducer 100" may be improved at higher areal densities.

Figure 5:
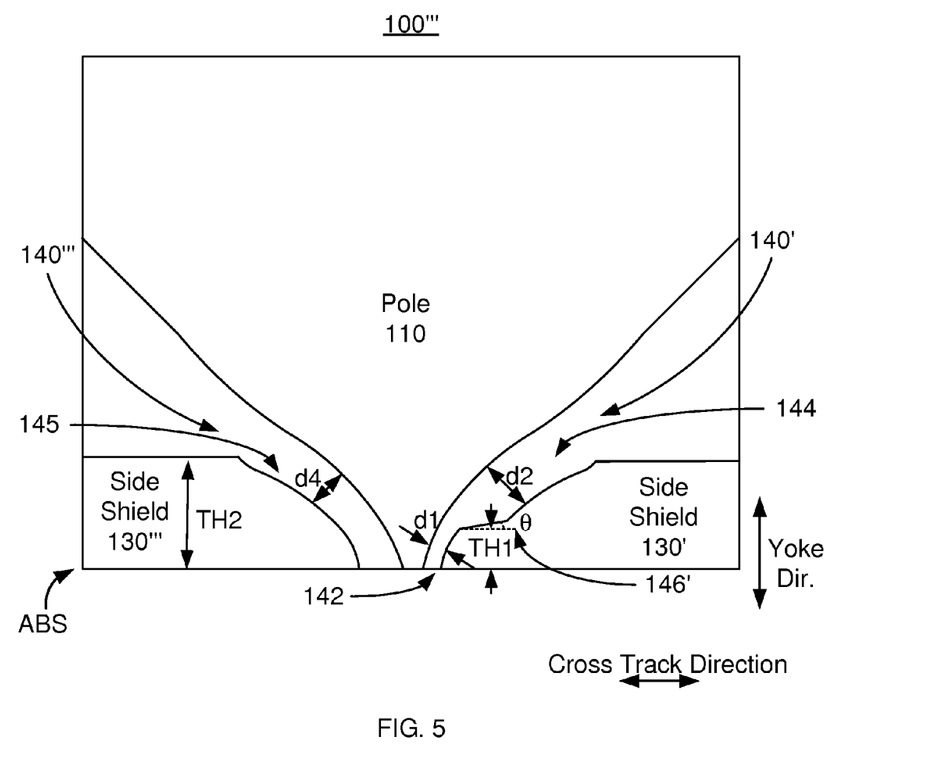
FIG. 5 depicts another exemplary embodiment of a magnetic recording transducer having a dual side gap.

FIG. 5 depicts a plan view of another exemplary embodiment of the magnetic recording apparatus, or transducer 100". For clarity, FIG. 5 is not to scale. For simplicity not all portions of the transducer 100''' are shown. In addition, although the transducer 100''' is depicted in the context of particular components other and/or different components may be used. For example, circuitry used to drive and control various portions of the disk drive is not shown. For simplicity, only single components are shown. However, multiples of each components and/or their sub-components, might be used. The disk drive may be a PMR disk drive. However, in other embodiments, the disk drive may be configured for other types of magnetic recording included but not limited to HAMR. Because the transducer 100''' is analogous to the transducer(s) 100, 100' and/or 100", similar components have similar labels. Thus, the transducer 100''' includes side gaps 140''' and 140', main pole 110 and side shields 130''' and 130' that are analogous to the side gap 140/140'/140", the main pole 110 and the side shields 130/130'/130", respectively.

The side shields 130' and 130''' may be magnetically and, in some embodiments, physically connected with the trailing shield and leading shield. In such embodiments, a full wraparound shield is formed. In other embodiments, the side shields 130' and 130''' may be physically and/or magnetically disconnected from the trailing shield and/or the leading shield of the underlayer.

In the embodiment shown in FIG. 5, the side shields 130' and 130''' and side gaps 140''' and 140' are configured to be asymmetric in the cross-track direction. Although a particular configuration is shown, other asymmetric configurations may be possible. Thus, one side includes side shield 130' and side gap 140' that includes a first side gap 142, a second side gap 144 and plateau 146'. The other side includes side shield 130''' and a side gap 140''' that includes a single conformal side gap 145. The side gap 145 has a width d4 that may be larger than the width d1 of the first side gap 142 (d4>d1). In some embodiments, the side gap 145 width is less than the second side gap 144 width (d4<d2). However in other embodiments, the side gap 145 width may be greater than or equal to the second side gap 144 width (d4≥d2).

The magnetic transducer 100''' may share the benefits of the magnetic transducers 100, 100' and/or 100''. In particular, the magnetic transducer 100''' may have improved performance at higher recording densities. Improved writability of the main pole 110 may be achieved while addressing WATER and/or ATI issues. Thus, overall performance of the transducer 100''' may be improved at higher areal densities.

Figure 6:
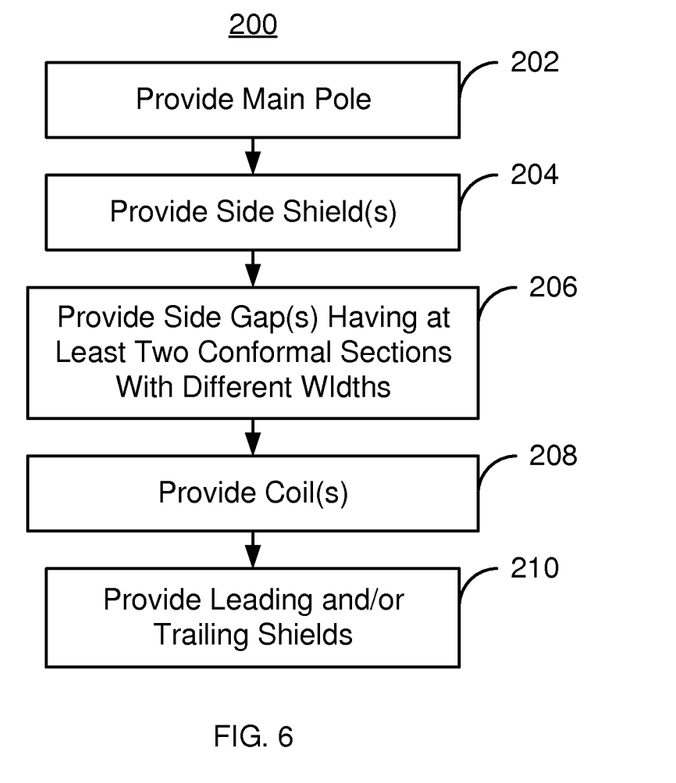
FIG. 6 depicts a flow chart of an exemplary embodiment of a method for providing a magnetic recording transducer.

FIG. 6 depicts an exemplary embodiment of a method 200 for providing a magnetic recording transducer which includes multiple conformal side gaps. For simplicity, some steps may be omitted, interleaved, combined and/or performed in another order. The method 200 is described in the context of providing a single magnetic recording disk drive and transducer 100. However, the method 200 may be used to fabricate multiple magnetic recording transducers at substantially the same time and may be used to fabricate other transducers including but not limited to the transducers 100', 100'' and 100'''. The method 200 is also described in the context of particular layers. A particular layer may include multiple materials and/or multiple sub-layers. The method 200 also may start after formation of other portions of the magnetic recording head. For example, the method 200 may start after a read transducer, return pole/shield and/or other structure(s) have been fabricated.

The main pole 110 is provided, via step 202. Step 202 may include forming a trench in one or more layers. The shape and location of the trench corresponds to the pole. For example, a photoresist mask having the desired shape may be provided on an intermediate layer. Hard mask layer(s) may be deposited on the photoresist mask and the photoresist mask removed. The hard mask so formed has an aperture having a shape corresponding to the photoresist mask. An etch or other removal process may then be performed in order to form the trench corresponding to the main pole. The trench formed has the desired geometry and location for formation of the main pole. For example, the top of the trench may be wider than the bottom so that the top of the main pole may be wider than the bottom. If a leading edge bevel is desired, the bottom of the trench may slope in the yoke direction. The trench may also be narrower in the pole tip region, near the ABS, than in the yoke region recessed from the ABS. After formation of other structures, such as a bottom or side gap, the formation of the main pole 110 may be completed by deposition of magnetic pole materials and, in some embodiments, a planarization or other process that removes any excess pole materials. In some embodiments, this portion of step 202 includes plating or otherwise depositing high saturation magnetization magnetic material(s). Further, a top, or trailing, bevel may be formed in the main pole 110. Formation of the trailing bevel may include covering a portion of the main pole recessed from the ABS and then ion milling the main pole at an angle from the down track direction. This step may be performed after or interleaved with formation of the side shields.

The side shields 130 are provided, via step 204. Step 204 may include configuring the walls of the side shields 130 closest to the main pole 110 such that the desired gap 140 may be formed. Step 204 may include multiple deposition and/or patterning steps to form the walls of the side shields 130 adjoining the side gap 140. For example, the portion of the side shield 130 adjacent to the first gap 142 may be formed first. The portion of the side shield 130 adjacent to the second gap 144 may be formed later.

The bottom, side gap 140 and/or write gap(s) are provided, via step 206. Step 206 may include depositing one or more nonmagnetic layers such that the bottom and side gaps are formed in the trench. In order to form first side gap 142 and second side gap 144, additional masking and/or deposition steps may also be performed. In some embodiments, at least part of step 206 may be performed before deposition of the pole material(s) in step 202. For example, at least the bottom portion of the gap, between the main pole 110 and the underlayer/leading shield 106 may be provided before plating of the main pole 110. However, formation of the write gap is carried out after the pole materials have been provided.

The coils 120 may also be formed, via step 208. Step 208 includes multiple masking and deposition steps that may be performed before and/or after the steps 202, 204 and 206. For example, if the coil 120 is a spiral coil, then step 208 may be completed before the steps 202, 204 and 206. In other embodiments, the coil 120 may be a toroidal (helical) coil, some of which is formed before the main pole 120 and some of which may be formed after the main pole 110.

The shield(s) 106 and/or 140 are optionally provided, via step 210. Step 210 may include plating or otherwise providing the magnetic material(s) for the leading and/or trailing shields.

Using the method 200, a magnetic transducer having improved performance may be fabricated. In particular, the magnetic field magnitude, gradient in the magnetic field, WATER, ATI and/or other properties may be enhanced at higher areal densities. Thus, performance of the transducer may be improved.

We claim:

1. A magnetic transducer having air-bearing surface (ABS) comprising:
   a main pole, a portion of the main pole residing at the ABS;
   at least one coil configured to energize the main pole;
   a side shield; and
   a side gap between the main pole and the side shield, the side gap being nonmagnetic, the side gap including a first side gap and a second side gap, the first side gap being conformal with the main pole, the second side gap being conformal with the main pole, the first side gap being between the second side gap and the ABS, the second side gap being wider than the first side gap, the first side gap having a first width, the second side gap has a second width at least twice the first width, the second width being not more than sixty nanometers greater than the first width;
   wherein the first side gap terminates not more than one hundred nanometers from the ABS.

2. The magnetic recording transducer of claim 1 wherein the side gap further includes a plateau adjoining the first side gap and the second side gap, the plateau being at an angle of not more than forty degrees from parallel to the ABS.

3. The magnetic transducer of claim 2 wherein the angle is not more than twenty degrees.

4. The magnetic transducer of claim 2 wherein the angle is not more than ten degrees.

5. The magnetic transducer of claim 2 wherein the plateau is parallel to the ABS.

6. The magnetic recording transducer of claim 1 wherein the second width is at least three times the first width.

7. The magnetic recording transducer of claim 1 wherein the second width is at least four times the first width.

8. The magnetic recording transducer of claim 1 wherein the second width is not more than forty nanometers greater than the first width and not less than thirty nanometers greater than the first width.

9. The magnetic recording transducer of claim 1 wherein the first side gap terminates not more than fifty nanometers from the ABS.

10. The magnetic recording transducer of claim 1 wherein the at least one side shield terminates not more than six hundred nanometers from the ABS.

11. The magnetic recording transducer of claim 1 further comprising:
   a leading shield; and
   a trailing shield, the main pole having a top and a bottom, the leading shield being proximate to the bottom of the main pole, the trailing shield being proximate to the top of the main pole such that the main pole is between the leading shield and the trailing shield.

12. The magnetic transducer of claim 4 wherein the angle is greater than zero degrees.

13. A data storage device comprising:
   a media;
   a slider including a magnetic recording transducer having an air-bearing surface (ABS), a main pole, a side gap, a side shield and at least one coil configured to energize the main pole, the side gap between the main pole and the side shield, the side gap being nonmagnetic, the side gap including a first side gap and a second side gap, the first side gap being conformal with the main pole, the second side gap being conformal with the main pole, the first side gap being between the second side gap and the ABS, the second side gap being wider than the first side gap, the first side gap having a first width, the second side gap has a second width at least twice the first width, the second width being not more than sixty nanometers greater than the first width;
   wherein the first side gap terminates not more than one hundred nanometers from the ABS.

14. A method for providing a magnetic transducer having air-bearing surface (ABS) comprising:
   providing a main pole, a portion of the main pole residing at the ABS;
   providing at least one coil for energizing the main pole;
   providing a side shield; and
   providing a side gap between the main pole and the side shield, the side gap being nonmagnetic, the side gap including a first side gap and a second side gap, the first side gap being conformal with the main pole, the second side gap being conformal with the main pole, the first side gap being between the second side gap and the ABS, the second side gap being wider than the first side gap, the first side gap having a first width, the second side gap has a second width at least twice the first width, the second width being not more than sixty nanometers greater than the first width;
   wherein the first side gap terminates not more than one hundred nanometers from the ABS.

15. The method of claim 14 wherein the side gap further includes a plateau adjoining the first side gap and the second side gap, the plateau being at an angle of not more than forty degrees from parallel to the ABS.

16. The method of claim 15 wherein the angle is not more than ten degrees and is greater than zero degrees.

17. The method of claim 14 wherein the second width is not more than forty nanometers greater than the first width and not less than thirty nanometers greater than the first width.

* * * * *